United States Patent
Norrick et al.

(10) Patent No.: US 9,404,417 B2
(45) Date of Patent: Aug. 2, 2016

(54) NOISE ATTENUATION COMPARTMENT WITH HEAT EXCHANGER ARRANGEMENTS FOR ENGINES DRIVING A LOAD

(71) Applicant: Cummins Power Generation, Inc., Minneapolis, MN (US)

(72) Inventors: Daniel Norrick, New Brighton, MN (US); Madhukar Mahishi, Minneapolis, MN (US)

(73) Assignee: CUMMINS POWER GENERATION, INC., Minneapolis, MN (US)

( * ) Notice: Subject to any disclaimer, the term of this patent is extended or adjusted under 35 U.S.C. 154(b) by 776 days.

(21) Appl. No.: 13/689,986

(22) Filed: Nov. 30, 2012

(65) Prior Publication Data

US 2014/0150437 A1     Jun. 5, 2014

(51) Int. Cl.
| | |
|---|---|
| F02B 77/13 | (2006.01) |
| F02B 63/04 | (2006.01) |
| H02K 9/08 | (2006.01) |
| F02B 77/11 | (2006.01) |
| F01P 3/18 | (2006.01) |
| H02K 9/19 | (2006.01) |
| F28D 21/00 | (2006.01) |

(Continued)

(52) U.S. Cl.
CPC .............. *F02B 77/13* (2013.01); *F02B 63/04* (2013.01); *F02B 63/044* (2013.01); *F02B 77/11* (2013.01); *H02K 9/08* (2013.01); *F01P 3/18* (2013.01); *F01P 5/08* (2013.01); *F01P 2001/005* (2013.01); *F02B 63/047* (2013.01); *F28D 2021/0094* (2013.01); *H02K 9/19* (2013.01)

(58) Field of Classification Search
CPC ........ F02B 63/044; F02B 77/11; F02B 77/13; F02B 63/047; F02B 63/048; F02B 2063/045; F02B 29/0456; F05D 2260/96; F05D 2240/14; F05D 2260/213; F05D 2260/205; F05D 2260/98; F02C 7/12; F02C 7/14; F24F 12/006; H02K 9/08; H02K 9/10; H02K 9/12; H02K 9/18; H02K 9/02–9/06; F01D 25/125; F01D 25/18; F01P 3/18; F01P 2001/005; F01P 5/08; F28D 2021/0094
USPC ............... 181/204, 198, 200; 123/204, 41.44; 60/798, 797, 39.83, 801, 806, 772; 165/51

See application file for complete search history.

(56) References Cited

U.S. PATENT DOCUMENTS

| | | | | |
|---|---|---|---|---|
| 3,566,142 A | * | 2/1971 | Dabell | ............ F02B 63/04 290/1 R |
| 4,306,613 A | * | 12/1981 | Christopher | .......... 165/276 |
| 4,608,946 A | | 9/1986 | Tanaka et al. | |

(Continued)

FOREIGN PATENT DOCUMENTS

| | | |
|---|---|---|
| EP | 1 057 985 A1 | 12/2000 |
| EP | 1 887 197 A2 | 2/2008 |

*Primary Examiner* — Phutthiwat Wongwian
*Assistant Examiner* — Alain Chau
(74) *Attorney, Agent, or Firm* — Taft Stettinius & Hollister LLP

(57) ABSTRACT

Systems, methods and apparatus for noise attenuation of a generator set are disclosed. The generator set includes an internal combustion engine enclosed within a compartment that substantially isolates the internal combustion from ambient air and a load connected to the internal combustion engine. A heat exchanger is disposed within or coupled to the compartment and is operable to cool air in the compartment without directly exchanging ambient air with compartment air.

23 Claims, 3 Drawing Sheets

(51) Int. Cl.
*F01P 1/00* (2006.01)
*F01P 5/08* (2006.01)

(56) References Cited

U.S. PATENT DOCUMENTS

| | | | | |
|---|---|---|---|---|
| 4,629,031 A * | 12/1986 | Kato | ........................ | F02B 77/13 181/202 |
| 4,696,156 A * | 9/1987 | Burr | ........................ | F01D 25/18 60/39.08 |
| 4,736,111 A * | 4/1988 | Linden | .................... | F02B 63/04 290/2 |
| 4,907,738 A * | 3/1990 | Harris | ........................... | 237/2 B |
| 4,924,818 A * | 5/1990 | Linden | .................... | F02B 63/04 123/198 E |
| 4,924,826 A * | 5/1990 | Vinson | ...................... | 123/195 C |
| 5,014,660 A | 5/1991 | Westerbeke, Jr. | | |
| 5,125,378 A | 6/1992 | Westerbeke, Jr. | | |
| 5,297,517 A | 3/1994 | Brandt et al. | | |
| 5,515,816 A | 5/1996 | Ball et al. | | |
| 5,575,349 A * | 11/1996 | Ikeda | ..................... | F02B 63/04 123/41.7 |
| 5,617,504 A * | 4/1997 | Sciacca | .................. | F02B 63/04 219/492 |
| 5,844,333 A * | 12/1998 | Sheerin | ........................... | 310/52 |
| 5,890,460 A | 4/1999 | Ball et al. | | |
| 5,929,394 A | 7/1999 | Westerbeke, Jr. | | |
| 6,082,094 A * | 7/2000 | Longardner et al. | ............ | 60/801 |
| 6,116,374 A | 9/2000 | Westerbeke, Jr. | | |
| 6,134,878 A * | 10/2000 | Amako et al. | .................. | 60/801 |
| 6,230,667 B1 | 5/2001 | Stauffer et al. | | |
| 6,246,134 B1 * | 6/2001 | Berrong et al. | ................. | 310/52 |
| 6,330,809 B1 | 12/2001 | Boardman, IV et al. | | |
| 6,470,666 B1 * | 10/2002 | Przytulski | ............. | F01D 25/125 184/6.11 |
| 6,630,756 B2 | 10/2003 | Kern et al. | | |
| 6,662,563 B1 | 12/2003 | Nordentoft | | |
| 6,799,112 B1 * | 9/2004 | Carter | ..................... | F01D 11/06 184/6.11 |
| 7,040,544 B2 | 5/2006 | Guyer | | |
| 7,284,709 B2 | 10/2007 | Guyer | | |
| 7,409,832 B2 * | 8/2008 | Nakano et al. | .................. | 60/797 |
| 7,461,510 B1 * | 12/2008 | Munson, Jr. | .................... | 60/796 |
| 7,674,147 B2 | 3/2010 | Zwieg et al. | | |
| 8,593,002 B2 * | 11/2013 | Hamm | ................... | B65D 47/02 290/1 A |
| 2002/0121780 A1 | 9/2002 | Westerbeke, Jr. | | |
| 2005/0160740 A1 | 7/2005 | Nakano et al. | | |
| 2010/0244458 A1 * | 9/2010 | Kotani | ...................... | F01P 5/08 290/1 B |
| 2012/0312503 A1 * | 12/2012 | Arrieta | .................... | F28D 15/00 165/104.11 |

* cited by examiner

NOISE ATTENUATION COMPARTMENT WITH HEAT EXCHANGER ARRANGEMENTS FOR ENGINES DRIVING A LOAD

BACKGROUND

The present application relates to noise attenuation for engines that drive a load, and more particularly, but not exclusively, to noise attenuation for engines in a compartment.

Noise pollution has become an increasing problem with engine driven machinery, especially when utilized near densely populated areas. For instance, large electrical power generation assemblies, such as back-up power sources and stand alone power supplies employing engines, are commonly utilized in areas of high population. Engine driven equipment is often placed in an enclosure for protection from the elements. To provide adequate cooling and ventilation, current engine driven systems provide openings through the engine enclosure to exchange air in the enclosure with ambient air. However, these openings can allow the emission of undesirable levels of engine noise from the enclosure. Even with the muffling provided by turbochargers, mufflers, and aftertreatment systems, the level of noise emitted through the enclosure openings can be undesirable for certain applications and situations.

Thus, there is an acute need for further contributions in this area of technology.

SUMMARY

One embodiment of the present invention is a unique noise attenuation arrangement for an internal combustion engine that drives a load. Other embodiments include apparatuses, systems, devices, methods, and combinations for providing noise attenuation of and cooling in a compartment for an internal combustion engine that drives a load outside the compartment. Further embodiments, forms, objects, features, advantages, aspects, and benefits shall become apparent from the following description and drawing.

BRIEF DESCRIPTION OF THE DRAWINGS

The description herein makes reference to the accompanying figures, and wherein.

DETAILED DESCRIPTION

Figure 1:
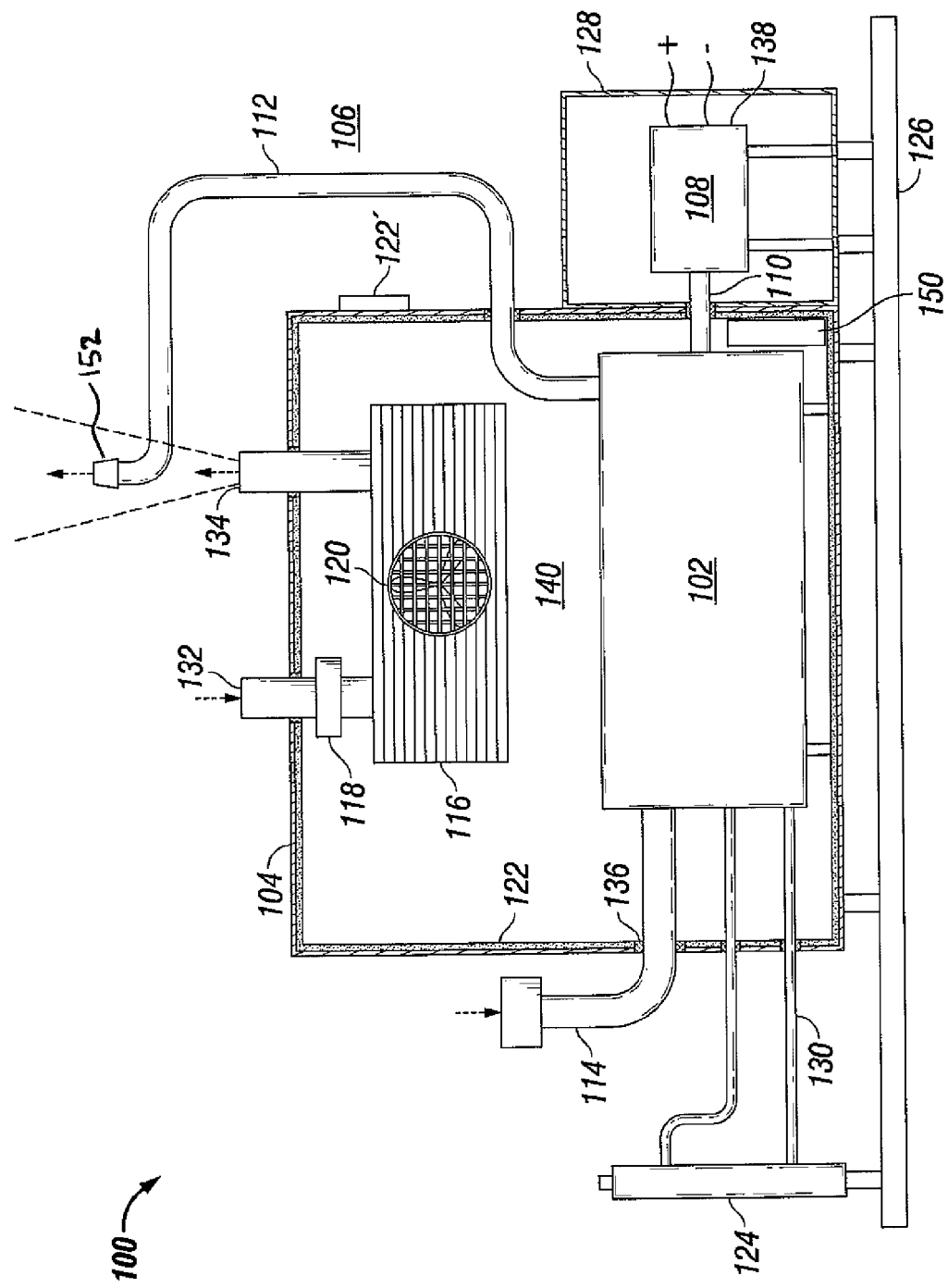
FIG. 1 is a partial cut-away view of a generator set having an engine compartment with cooling and noise attenuation features.

For purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein being contemplated as would normally occur to one skilled in the art to which the invention relates.

FIG. 1 includes a generator set with a noise attenuating system for an internal combustion engine. In the illustrated embodiment, a generator set 100 includes a compartment 104 housing an internal combustion engine 102 in an interior space of compartment 104. The internal combustion engine includes an air intake 114 and an exhaust outlet 112 extending through the wall of compartment 104. The air intake 114 and the exhaust outlet 112 place internal combustion engine 102 in flow communication with ambient air 106. Generator set 100 also includes plumbing 130 extending through the wall of compartment 104 to a radiator 124 for engine cooling. While outlet 112, intake 114 and plumbing 130 are shown extending through end walls of compartment 104, one or more of these features may alternatively extend through a top, bottom or side wall of compartment 104.

The internal space defined by compartment 104 is in fluid communication with a heat exchanger 116 that is operable to remove heat from compartment 104 generated by operation of internal combustion engine 102. Accordingly, compartment 104 is arranged with no or minimal openings to the outside ambient air 106, providing an enclosure for internal combustion engine 102 that is closed or substantially closed and that eliminates openings in compartment 104 for direct air-to-air exchange for cooling of compartment 104. Therefore, noise produced by operation of internal combustion engine 102 is isolated in compartment 104 and substantially reduced outside compartment 104.

The internal combustion engine 102 can take a variety of forms including, but not limited to, reciprocating engines, rotary engines, spark ignition engines, compression ignition engines, gas turbine engines, and engines that can consume liquid or gaseous fuels. In certain, non-limiting embodiments, internal combustion engine 102 can take the form of a diesel engine, gasoline engine, or a natural gas engine. The internal combustion engine 102 can be naturally inducted or aspirated, or alternatively, can include forced induction, including, but not limited to turbocharging.

The internal combustion engine 102 includes a cooling jacket (not shown) through which internal combustion engine 102 transfers heat to a cooling fluid. Heat from the cooling fluid may then be transferred by plumbing 130 to radiator 124, or other heat exchange device, located outside of compartment 104. The radiator 124 cools the cooling fluid by transferring the heat within the cooling fluid to the ambient air 106. The plumbing 130 can be any device, passage, and/or tubing which allows for a cooling liquid to flow to the radiator 124. The cooling fluid can include, but is not limited to, glycol, antifreeze, water, and/or oil, among others. The internal combustion engine 102 can alternately and/or additionally be oil cooled or have a separate oil cooler as a separate heat exchanger (not shown) or incorporated into radiator 124.

The internal combustion engine 102 provides power to rotate a shaft 110 coupled to a load 108. The shaft 110 can include a portion of a crankshaft (not shown) of internal combustion engine 102, however, shaft 110 can be any shaft which is capable of transferring torque from an output of internal combustion engine 102 to load 108.

The load 108 is located outside of compartment 104 and can be driven by a shaft, belt, chain, gear, spline, hydraulic connection, or any other means to transfer power from internal combustion engine 102 to load 108. The load 108 can include, but is not limited to, a propeller, a pump, fan, and/or a compressor, among other devices, which require power from internal combustion engine 102. As depicted in the embodiment shown in FIG. 1, internal combustion engine 102 provides mechanical power to load 108 that includes a generator 138. As used herein, the term generator 138 can be any device that converts mechanical energy to electrical energy which includes, but is not limited to, an alternator, dynamo, or other rotating or reciprocating electromagnetic generator. The generator 138 may be housed in a second compartment 128 that is adjacent to but positioned outside of compartment 104 housing the internal combustion engine 102. In one specific embodiment, the adjacent compartment 128 can house power electronics (not shown), including but not limited to inverters, switching elements, rectifiers, transistors, transfer switches, and control electronics, for the internal combustion engine 102 and/or the generator 138. The adjacent compartment 128 can also include a number of cooling apertures and/or other cooling systems. In further embodiments, load 108 can be located in any configuration whereby load 108 receives power from the internal combustion engine 102. It is noted that the load 108 can also be cooled, either be ambient air or by a cooling liquid, such as oil, water, or glycol, with an associated external heat exchanger.

In one specific embodiment, internal combustion engine 102 is a diesel engine dedicated to driving an electrical generator 138 to form generator set or "genset" 100. It is contemplated that generator set 100 is mounted on a skid 126, or other suitable mounting platform, to increase the mobility of generator set 100. The skid 126, or other mounting platform, may be included into a vehicle semi-trailer, an ISO container, a ship, a locomotive, and/or may be a stand-alone unit.

The compartment 104 is designed in to reduce levels of sound or noise from internal combustion engine 102 audible outside of compartment 104. The effective isolation of internal combustion engine 102, and compartment air 140, with respect to load 108 and ambient air 106 reduces noise from internal combustion engine 102 outside compartment 104. The compartment 104 can be constructed of any suitable material, including, but not limited to steel, aluminum, and/or polymers and may include an internal construction to aid in sound deadening, such as a honeycomb design, foam core, insulation, baffles, corrugation, or other sound deadening pattern, design or material. The apertures in compartment 104 for air intake 114, exhaust outlet 112, plumbing 130, output shaft 110, intake 132 and outlet 134 of the heat exchanger 116, communication cables, etc. in the compartment 104 can be limited in size and/or include seals, such as seal 136, to minimize or eliminate noise transmission from compartment 104 to the ambient air 106 or intrusion of outside environmental elements, such as rain, snow, dust or other such contaminants. The exhaust outlet 112 can be operably coupled to a turbocharger, aftertreatment system, muffler, and/or baffles to suppress noise from the exhaust stream and/or enhance engine performance. The air intake 114, in addition to a filter, can include a number of baffles to aid in the suppression of noise from the internal combustion engine 102.

At least a portion of the compartment 104 may or may not include a sound insulating and/or deadening material 122. The sound insulating material 122 can line the entire compartment 104 or portions of compartment 104, such as the corners of compartment 104. The sound insulating material may also be provided additionally or alternatively on the outside of compartment 104, as indicated by sound insulating material 122'. Any configuration of sound insulating material 122, 122' is contemplated which attenuates noise from internal combustion engine 102 in compartment 104. The sound insulating material 122, 122' can include, but is not limited to, porous absorbers such as rubber foams and melamine sponges, honeycomb barriers, expanded polystyrene, acoustic foam and/or board, among other sound insulating materials available. The amount of insulation 122, 122' and/or sealing 136 of compartment 104 is dependent upon the particular application and level of noise suppression sought.

The compartment 104 further includes heat exchanger 116. The internal combustion engine 102 emits heat to compartment air 140 during operation. The amount of heat retained within compartment 104 can also increase due to the presence of sound insulating material 122, 122' and/or seals 136 in and/or around compartment 104. Heat retained within compartment 104 can damage heat sensitive devices which can be included within compartment 104, including, but not limited to, power electronics, an engine control module (ECM), fuel tubing, etc. or, in some applications, may reduce the efficiency of internal combustion engine 102. The heat exchanger 116 removes heat from air 140 of compartment 104 while maintaining a desired level of compartment isolation and noise attenuation. The heat exchanger 116 may be of any type to remove heat from compartment air 140. The size, makeup, materials and fluid mechanics of heat exchanger 116 can be determined based upon the amount of heat to be removed from compartment air 140 and the heat introduced into compartment 104 by the internal combustion engine 102. In one embodiment, the heat exchanger is selected based on the heat introduced by the internal combustion engine 102 into the compartment 104 and compartment air 140 at an average contemplated load or, alternatively, at a maximum load/power output.

In the embodiment of heat exchanger 116 depicted in FIG. 1, heat exchanger 116 is an air-to-air heat exchanger. The heat exchanger 116 pulls ambient air 106 into an air intake 132 of heat exchanger 116. The compartment air 140 is passed across the heat exchanger 116, wherein heat from compartment air 140 is transferred to ambient air 106 which was drawn into heat exchanger 116, forming heated air. The heated ambient air is then discharged from heat exchanger 116 through an air outlet 134 back into ambient air 106. The heat exchanger 116 includes a core or other membrane (not shown) which allows for the effective transfer of heat from compartment air 140 to ambient air 106 drawn into heat exchanger 116. While air intake 132 and outlet 134 are shown extending through a top of compartment 104, it is also contemplated that one or both of the inlet 132 and outlet 134 can extend through a side wall, end wall or bottom of compartment 104.

Figure 2:
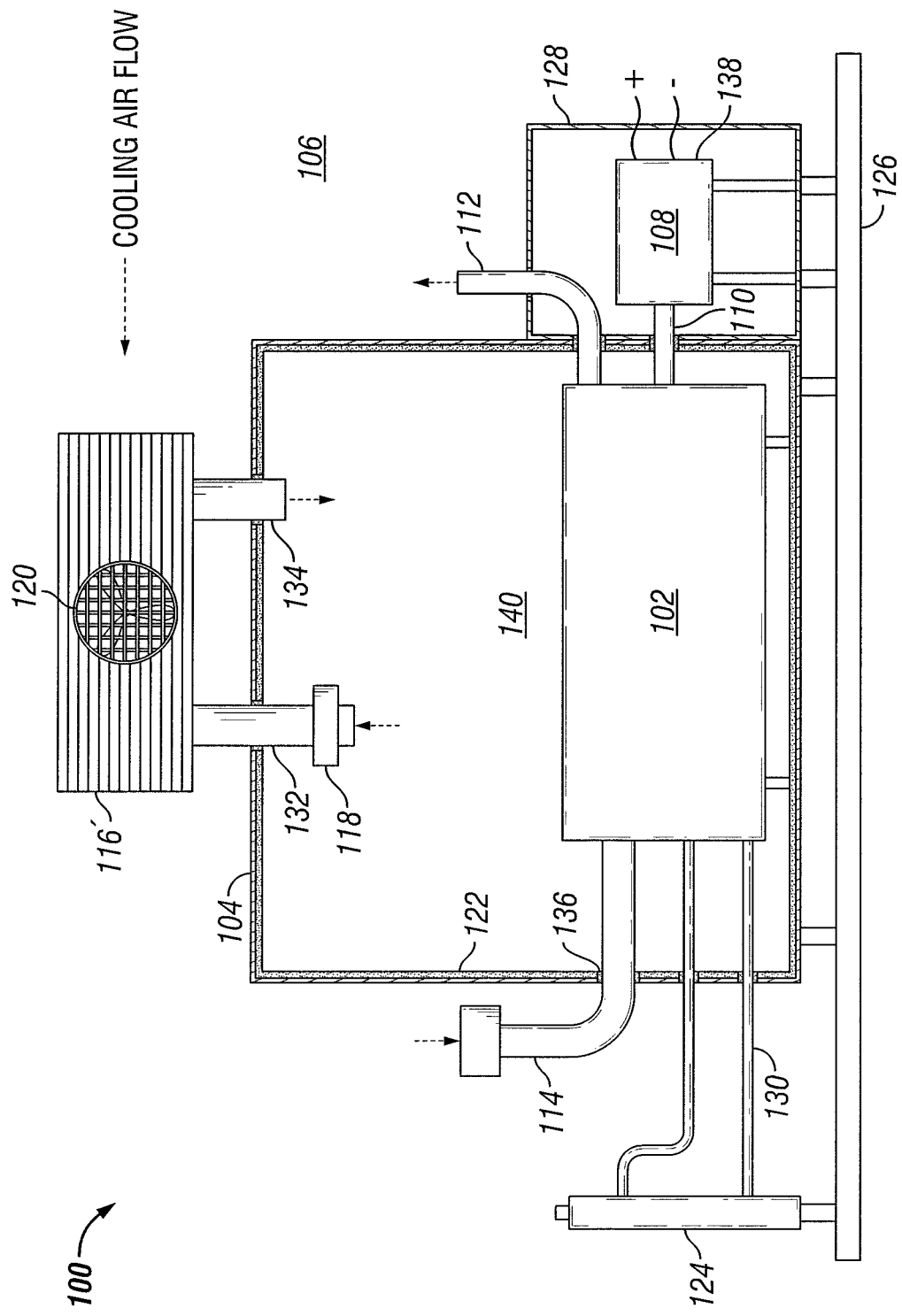
FIG. 2 is a partial cut-away view of another embodiment generator set having an engine compartment with cooling and noise attenuation features.

It is noted that in various alternative embodiments, such as shown in FIG. 2, heat exchanger 116' is external to the engine compartment 104 and draws compartment air 140 out to be cooled in the external heat exchanger 116'. It is noted that such an external heat exchanger 116' can allow for remote mounting of the heat exchanger 116' or for the heat exchanger 116' to be placed into the ambient air stream being directed into the genset 100 by a fan or other air moving device or method. It is also noted that the cooling ambient air flow through a genset 100 is often arranged such that it passes by or through the generator 138 first, then is utilized to cool the engine 102 or engine compartment 140 then out past the radiator 124. It is noted that the external heat exchanger 116' can be placed anywhere in the cooling ambient air stream as it passes through the genset 100. In a further embodiment, part of this cooling ambient air flow through the genset 100 can be divided off as it flows through and routed through a duct containing an external heat exchanger 116' or through an internal heat exchanger 116 via inlet 132 and outlet 134. Examples of ambient air redirection can include, but are not limited to, ambient air being divided off from the output of a fan that feeds ambient air into genset 100, from ambient air flowing into or out of radiator 124, or from any other convenient point along the cooling airflow path.

Referring back to FIG. 1, a fan 120 moves compartment air 140 across or through heat exchanger 116 to better effectuate the heat transfer therethrough. A blower, radial fan, axial fan, exhaust turbine, eductor, positive displacement pump or other device or arrangement 118 for impelling air flow may also be incorporated into air intake 132 and/or air outlet 134 of heat exchanger 116, increasing the flow of ambient air 106 into heat exchanger 116 and heated ambient air out of heat exchanger 116. In further embodiments, it is contemplated that heat exchanger 116 does not utilize fans and operates with natural conduction and convection. In further embodiments, it is contemplated that heat exchanger 116 can be an air-to-liquid heat exchanger, in which case a cooling liquid, including, but not limited to, glycol, antifreeze, or water, may be circulated through a core of heat exchanger 116 to remove heat from compartment 104.

Figure 3:
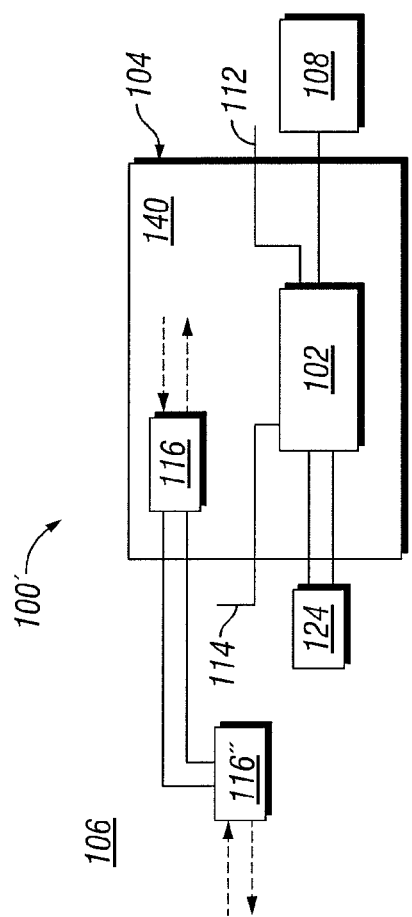
FIG. 3 is a schematic of another embodiment generator set having an engine compartment with cooling and noise attenuation features.

In the case of an air-to-liquid heat exchanger, another embodiment genset 100' shown schematically in FIG. 3 includes a second heat exchanger 116" that can be located outside of compartment 104 such that heat drawn from compartment 104 is expelled into ambient air 106. Air from compartment 104 is exchanged with liquid in heat exchanger 116, and the heat added to the liquid of heat exchanger 116 is exchanged with ambient air 106 in heat exchanger 116". In one embodiment, the second air-to-liquid heat exchanger 116" can be mounted remotely from the genset 100. In yet another embodiment, the second air-to-liquid heat exchanger 116" is mounted in a cooling ambient air stream flowing through the genset 100 or is mounted to or incorporated with the radiator 124 of the engine 102.

Figure 4:
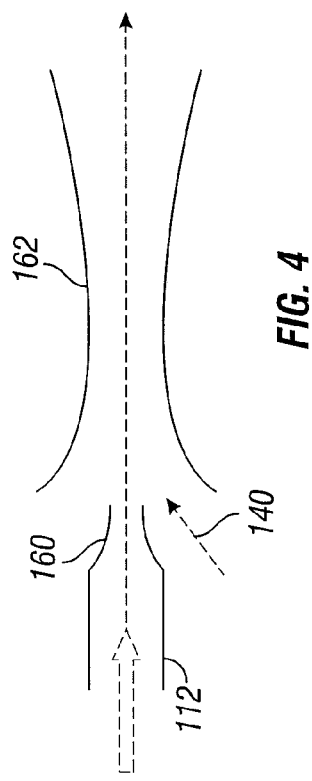
FIG. 4 is a schematic of one embodiment of system for inducing air flow to the heat exchanger system with exhaust flow.

Referring to FIGS. 1 and 4, there is shown a schematic for inducing cooling air flow with an eductor 152 that utilizes the exhaust stream from engine 102. In this arrangement, the kinetic energy of the exhaust gas flow is used to induce an associated educted air flow which can be extracted directly from the engine compartment, the heat exchanger 116, across an external heat exchanger 116', or from a second compartment. In one embodiment, this educted air flow is pulled from outlet 134 to move cooling air through heat exchanger 116 to remove heat from the compartment 104. In another embodiment, the extracted air flow is directed to flow across external heat exchanger 116' first. In the illustrated embodiment, exhaust 112 is provided with a nozzle 160 that directs exhaust flow into diffuser 162. Air is educted from heat exchanger 116 or across external heat exchanger 116' into diffuser 162 and new ambient air is drawn into or across the heat exchanger 116 or 116'. In this embodiment, fan 120 can be eliminated, lowering costs and increasing efficiency of the heat exchanger system since the moving parts of the fan 120 are eliminated along with the power required to operate fan 120. In addition, the quantity of air exchanged is proportional to the engine power such that when the engine power, and therefore the heat in compartment 104, increases so does the quantity of ambient air and heat exchanged with the heat exchanger system.

Since compartment 104 is actively cooled with a dedicated heat exchanger system as discussed above, the insulation of compartment 104 can also serve to prevent heat loss from compartment 104 in addition to reducing noise attenuation. In FIG. 1, genset 100 includes a heater 150 to maintain engine 102 at a desired temperature to allow rapid and reliable starting and load acceptance without engine damage due to rapid thermal expansion or thermal shock. In many typical genset enclosures that have a heated standby mode of operation, much of the heat produced by heater 150 would be lost by convective transfer through compartment 104 to ambient air 106 through openings in the engine compartment 104 and/or genset enclosure. Insulating material 122 and/or 122' in the enclosed and thermally isolated genset 100 of the present embodiment provides a significant reduction in the amount of energy needed to maintain engine 102 at a desired standby or other selected temperature and conserves power that would be otherwise wasted in maintaining the temperature with heater 150 in an un-insulated compartment 104.

One exemplary embodiment includes a generator set with an internal combustion engine coupled to a load, where the internal combustion engine is substantially isolated from the load and ambient air within a compartment. The generator set includes at least one heat exchanger to providing cooling of compartment air during operation of the internal combustion engine without exchanging ambient air for compartment air. In one refinement of this embodiment, the internal combustion engine is completely isolated in the compartment from ambient air. In a further refinement of this embodiment, the heat exchanger is separate from the cooling system of the internal combustion engine and the intake and exhaust system of the internal combustion engine.

Another exemplary embodiment includes an apparatus, including a liquid cooled internal combustion engine enclosed within a compartment. An air intake of the internal combustion engine and an exhaust outlet of the internal combustion engine are in fluid communication with a first fluid external to the compartment. The apparatus further includes a load, disposed outside of the compartment, mechanically coupled to an output shaft of the internal combustion engine. The apparatus further includes a heat exchanger that is operable to exchange heat from air in the compartment with a cooling fluid, where the cooling fluid is isolated from the air in the compartment.

In certain embodiments, the cooling fluid is one of ambient air and a cooling liquid. In further embodiments, the heat exchanger is an air-to-air heat exchanger and the cooling fluid is ambient air. In other embodiment, wherein the heat exchanger is an air-to-liquid heat exchanger, and where the heat exchanger is coupled through walls of the compartment to a second liquid-to-air heat exchanger that is external to the compartment and is communication with ambient air. In further embodiments, a first fan is in fluid communication with the cooling fluid. In some embodiments, the load is a generator. In further embodiments, the internal combustion engine is a diesel engine having a turbocharger. In some embodiments, sound insulation is secured to an interior portion of the compartment.

In some embodiments, a second fan is disposed in the compartment and the fan is operable to move a portion of compartment air across the heat exchanger. In some embodiments, a radiator is located external to the compartment and is fluid communication with the internal combustion engine. In further embodiments, the load is selected from the group of loads consisting of a generator, a pump, a compressor, and a propeller. In other embodiment, the apparatus includes a heater in the compartment to heat compartment air to maintain a desired state of operability of the internal combustion engine.

Another exemplary embodiment is a system, including a generator operably coupled to a liquid cooled internal combustion engine, wherein the internal combustion engine is enclosed within a compartment and the generator is disposed outside the compartment. The internal combustion engine includes an air intake and an exhaust outlet, the air intake and exhaust outlet extending through, but sealed to, the compartment in fluid communication with ambient air outside of the compartment. The system includes a heat exchanger system that exchanges heat from air in the compartment with ambient air outside the compartment utilizing a cooling fluid passing through the heat exchanger system without exchanging air in the compartment with ambient air outside of the compartment.

In certain embodiments, the system further includes a radiator, disposed outside the compartment, in fluid communication with the internal combustion engine. In certain embodiments the compartment enclosing the internal combustion engine, along with the radiator and the generator, are mounted to a moveable skid. In further embodiments, the internal combustion engine is a diesel engine, the diesel engine further comprising a turbocharger. In certain embodiments, the system further includes a muffler in fluid communication with the exhaust outlet and an air baffle in fluid communication with the air intake. In yet further embodiments, the system includes a first fan operably coupled to the heat exchanger that is operable to circulate ambient air therethrough or over. In some embodiments, the system includes a second fan disposed within the compartment operable to create a flow of at least a portion of heated compartment air across or through the heat exchanger. In other embodiment, the heat exchanger system includes an air-to-air heat exchanger. The heat exchanger can be located in the compartment or external to the compartment.

Yet another exemplary embodiment is a method, including providing a liquid cooled internal combustion engine housed within a compartment, the internal combustion engine having a load disposed outside of the compartment mechanically coupled to an output shaft of the internal combustion engine. The method further includes operating the internal combustion engine and mechanically transferring power from the internal combustion engine to the load to power the load. The method further includes directing a portion of ambient air to an air intake of the internal combustion engine from outside the enclosure and directing exhaust from the internal combustion engine to mix with ambient air outside of the enclosure. The method further includes directing a gas or liquid cooling fluid through a heat exchanger located within the compartment to reduce the temperature of air in the compartment without exchanging ambient air with compartment air.

In certain embodiments, directing the cooling fluid through the heat exchanger is executed in response to determining that an enclosure temperature exceeds a predetermined enclosure temperature threshold. In further embodiments, the method further includes flowing a portion of coolant in a cooling loop that connects the internal combustion engine and a radiator disposed outside of the enclosure.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
   an internal combustion engine that is liquid cooled with a cooling liquid, the internal combustion engine being enclosed within a compartment configured to fluidly isolate ambient air thereby reducing direct compartment air to ambient air exchange, wherein an air intake of the internal combustion engine and an exhaust outlet of the internal combustion engine extend through the compartment for fluid communication with the ambient air external to the compartment;
   a radiator located external to the compartment, wherein the cooling liquid of the internal combustion engine is coupled through the compartment by plumbing extending through the compartment for circulation of cooling liquid therebetween, where the radiator is operable to exchange engine heat from the cooling liquid of the internal combustion engine to ambient air from outside the compartment;
   a load, disposed outside of the compartment, mechanically coupled to the internal combustion engine; and
   a heat exchanger, wherein the heat exchanger is operable to exchange heat from air in the compartment to a cooling fluid, wherein the cooling fluid is isolated from the air in the compartment.

2. The apparatus of claim 1, wherein the cooling fluid of the heat exchanger is one of ambient air and a cooling liquid.

3. The apparatus of claim 2, wherein the heat exchanger is an air-to-liquid heat exchanger, and where the heat exchanger is coupled through walls of the compartment to a second liquid-to-air heat exchanger that is external to the compartment and is communication with ambient air.

4. The apparatus claim 1, wherein the heat exchanger is disposed one of inside or outside the compartment.

5. The apparatus of claim 1, wherein the heat exchanger is an air-to-air heat exchanger and the cooling fluid is ambient air.

6. The apparatus of claim 5, wherein the heat exchanger is internal to the compartment and includes an inlet and an outlet extending through the compartment, and further comprising one of a radial fan, an axial fan, an eductor, an exhaust turbine, or a positive displacement pump in at least one of the inlet and outlet to direct ambient air through the heat exchanger.

7. The apparatus of claim 5, wherein the heat exchanger is external to the compartment and includes an inlet and an outlet extending through the compartment, and further comprising one of a radial fan, an axial fan, and exhaust turbine, or a positive displacement pump in at least one of the inlet and outlet to direct compartment air through the heat exchanger.

8. The apparatus of claim 1, wherein the internal combustion engine is one of a reciprocating engine, a rotary engine, a spark ignition engine, a compression ignition engine, a gas turbine engine, a diesel engine, a gasoline engine, or a natural gas engine, and the engine further utilizes one of natural induction or forced induction.

9. The apparatus of claim 1, further comprising sound or thermal insulation secured to at least one of an interior portion of the compartment and an external portion of the compartment.

10. The apparatus of claim 9, further comprising a heater in the compartment operable to maintain air in the compartment at a desired temperature.

11. The apparatus of claim 1, further comprising a fan disposed in the compartment, wherein the fan is operable to move at least a portion of air in the compartment one of across or through the heat exchanger.

12. The apparatus of claim 1, further comprising a diffuser outside the compartment arranged over the exhaust outlet and over an outlet for the cooling fluid of the heat exchanger, wherein the diffuser receives an exhaust flow from the internal combustion engine to educt a flow of cooling fluid from the heat exchanger through the diffuser.

13. The apparatus of claim 1, wherein the load is selected from the group of loads consisting of a generator, a pump, a compressor, a fan and a propeller.

14. A system, comprising:
an internal combustion engine that is liquid cooled with a cooling liquid and a generator operably coupled to the internal combustion engine; a compartment enclosing the internal combustion engine, the compartment configured to fluidly isolate ambient air thereby reducing direct compartment air to ambient air exchange with the generator disposed outside the compartment;
a radiator, disposed outside the compartment, that is in fluid communication with the cooling liquid of the internal combustion engine; wherein the internal combustion engine includes an air intake and an exhaust outlet extending through the compartment, the air intake and exhaust outlet being in fluid communication with ambient air outside of the compartment; and a heat exchanger system, wherein the heat exchanger system exchanges heat from air in the compartment to ambient air outside the compartment utilizing a cooling fluid passing through the heat exchanger system without exchanging air in the compartment with ambient air outside of the compartment.

15. The system of claim 14, wherein the compartment, the internal combustion engine, the radiator, and the generator are mounted to a moveable skid.

16. The system of claim 14, wherein the internal combustion engine is one of a gas turbine engine, a reciprocating engine, a rotary engine, a spark ignition engine, or a compression engine and the engine further utilizes one of natural induction or forced induction.

17. The apparatus of claim 14, wherein the heat exchanger system further comprises an air-to-air heat exchanger that is located within the compartment and the cooling fluid is ambient air.

18. The system of claim 17, wherein the heat exchanger system includes an inlet and an outlet extending through the compartment to ambient air, and further comprising one of a radial fan, an axial fan, an eductor, an exhaust turbine, or a positive displacement pump in at least one of the inlet and outlet to direct ambient air through the air-to-air heat exchanger.

19. The system of claim 17, further comprising a fan disposed in the compartment, wherein the fan is operable to move at least a portion of air in the compartment one of across or through the air-to-air heat exchanger.

20. The apparatus of claim 14, further comprising a diffuser outside the compartment arranged over the exhaust outlet and over an outlet for the cooling fluid of the heat exchanger, wherein the diffuser receives an exhaust flow from the internal combustion engine to educt a flow of cooling fluid from the heat exchanger through the diffuser.

21. A method, comprising:
positioning a liquid cooled internal combustion engine within a compartment configured to fluidly isolate ambient air thereby reducing direct compartment air to ambient air exchange and a radiator outside of the compartment, the radiator being in fluid communication with the cooling liquid of the internal combustion engine, the internal combustion engine being mechanically coupled to a load disposed outside of the compartment;
operating the liquid cooled internal combustion engine;
mechanically transferring power from the internal combustion engine to the load to power the load;
cooling air in the compartment with a heat exchanger located in the compartment, wherein the heat exchanger exchanges heat from air in the compartment with a cooling fluid passing through the heat exchanger without exchanging air in the compartment with ambient air; and
directing an exhaust flow from the internal combustion engine through a diffuser outside of the compartment that is arranged over an exhaust outlet of the internal combustion engine and also arranged over an outlet for the cooling fluid of the heat exchanger, wherein the exhaust flow from the internal combustion engine educts a flow of cooling fluid from the heat exchanger through the diffuser into ambient air.

22. The method of claim 21, further comprising:
directing ambient air from outside the compartment to an air intake of the internal combustion engine and directing exhaust from the internal combustion engine to ambient air outside of the compartment; and
determining that a compartment temperature exceeds a predetermined compartment temperature threshold before cooling air in the compartment.

23. The method of claim 21, further comprising flowing liquid coolant in a cooling loop between the heat exchanger and a second heat exchanger disposed outside of the compartment.

* * * * *